(No Model.)  2 Sheets—Sheet 1.

F. A. SAWYER.
CARRIAGE STEP.

No. 287,870. Patented Nov. 6, 1883.

WITNESSES
Willard L. Fogg
Fred Harris

INVENTOR
F. A. Sawyer
by his attys
Clarke & Raymond (No Model.)   F. A. SAWYER.   2 Sheets—Sheet 2.
CARRIAGE STEP.

No. 287,870.   Patented Nov. 6, 1883.

WITNESSES
Willard C. Fogg
Fred Harris

INVENTOR
F. A. Sawyer
by his attys
Clarke & Raymond

UNITED STATES PATENT OFFICE.

FRANCIS A. SAWYER, OF BOSTON, MASSACHUSETTS.

CARRIAGE-STEP.

SPECIFICATION forming part of Letters Patent No. 287,870, dated November 6, 1883.

Application filed November 20, 1882. (No model.)

*To all whom it may concern:*

Be it known that I, FRANCIS A. SAWYER, of Boston, in the county of Suffolk and State of Massachusetts, have invented a certain new and useful Improvement in Carriage-Steps, of which the following is a full, clear, and exact description, reference being had to the accompanying drawings, forming a part of this specification in explaining its nature, in which—

Figure 1:
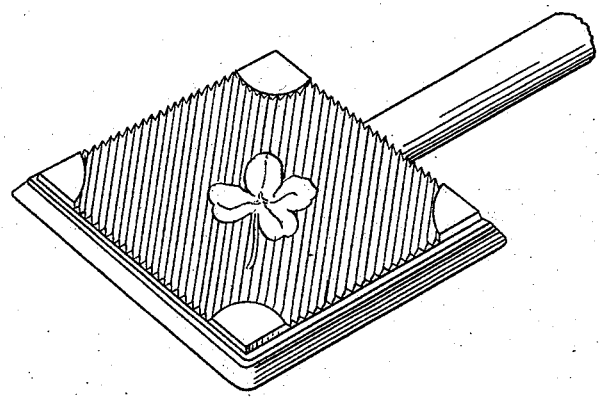
Figure 2:
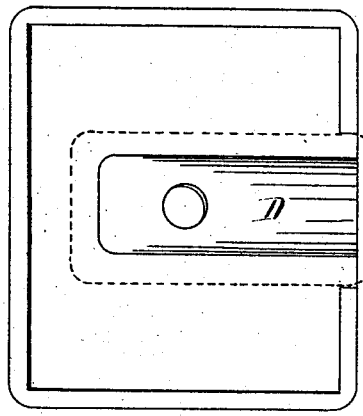
Figure 3:
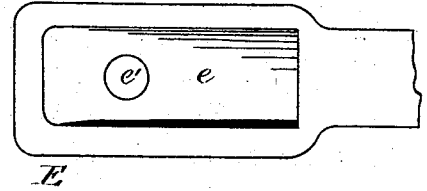
Figure 4:
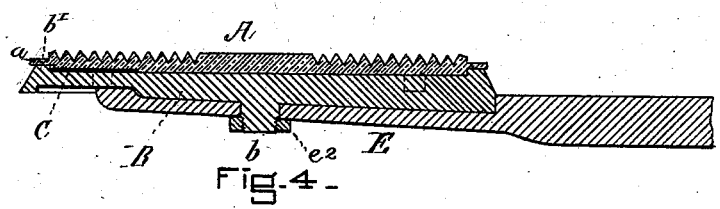
Figure 5:
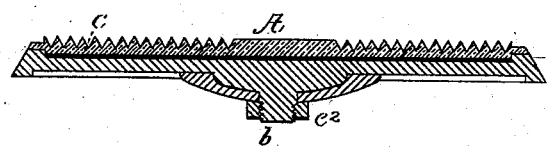
Figure 6:
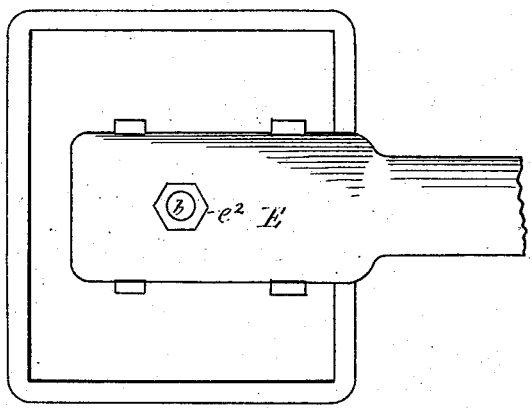
Figure 7:
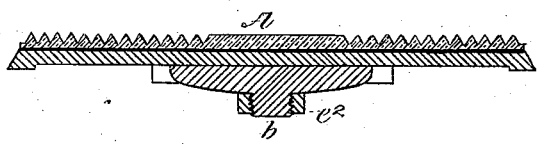

Figure 1 represents in perspective a step containing my invention. Fig. 2 represents in plan the step reversed and in dotted outlines the shank. Fig. 3 represents a plan of the shank. Fig. 4 is a vertical central section of the step and shank. Fig. 5 is a vertical central section at right angles to the section shown in Fig. 4. Fig. 6 represents in plan reversed a modification, and Fig. 7 shows the tread or surfacing compound attached to a flat supporting-plate.

The principal object of the invention is to provide means whereby a comparatively thin layer of rubber or other equivalent vulcanizable material can be used as the treading-surface of the step. In addition to this the invention consists in certain features of construction, which will hereinafter be more fully described, and which relate, especially, to the method of fastening a step to the shank, and to the disposition of the rubber in relation to the wall of the step, so that the fin or waste about the edge of the step may be cut therefrom without injuring the pattern or design.

Heretofore it has been customary to fasten the rubber tread of carriage-steps in place either by vulcanizing the rubber covering to an independent plate, which is adapted to be fastened to the carriage-plate, as described in my Patent No. 247,116, or to vulcanize directly to the carriage step or plate, as described in my Patent No. 203,076. The last-named step is the one which most nearly approaches the present invention; but the present invention is an improvement upon that, in that less rubber is employed for the tread and it is more securely fastened to the step-plate. To properly unite the rubber to the step-plate in the manner described in the patent, the rubber must be thicker than is actually necessary for practical purposes, and the rubber is held to the step-plate only by what may be called "rivets of rubber" which pass through holes in the step-plate and bind or knit the rubber to the plate—in other words, there is no sufficient adhesion of the rubber to the upper surface of the plate. Consequently the rubber must be thicker than is practically necessary, in order that it may be fastened sufficiently strong, and in order that it may wear suffi ciently long without danger of its becoming detached from the plate; and more especially is this necessary when a raised or ribbed surface is used, because no portion of the rubber covering can be depressed below a certain line or thickness without weakening the fastening. I have ascertained, however, that it is practicable to attach the rubber tread to the metal step-plate, so that a large section or the entire surface of the rubber in contact with the metal shall be firmly and securely fastened, and this fastening enables me to use as efficiently a less quantity of rubber than that employed in practicing said patented invention, and at the same time I obtain a securer and more permanent union between the rubber and the plate.

Referring to the drawings, A represents the rubber covering or tread, and B the step-plate. One method which I prefer to employ for uniting the rubber to the step-plate consists in interposing between the metal step-plate and the rubber a film of any metal which, at the temperature of vulcanization, has a considerable tendency to unite with the sulphur always contained in the rubber compounds. The easiest and best method of producing a film on the stop is by electroplating, or by what is known as "dipping" in a weak solution of metals possessing a tendency to unite with sulphur, the most suitable being copper. Lead and zinc may likewise be used. In practicing the process a weak solution of sulphate of copper is made—say, two or three ounces of crystallized salt to the gallon—and this solution may be acidulated with sulphuric acid— about one-half a gill of strong acid to the gallon. The film should be very thin; therefore the metal step-plate should be immersed in the solution only a sufficient time to produce a bright copper-colored deposit, and the rubber is then vulcanized to the step-plate thus prepared in molds under pressure, the rubber forming a union with the metal of the step, which is very strong and very durable. Another way of applying the rubber to the surface of the metal step is by abrading or roughening the metal surface with sand or emery paper, or in any other suitable way after the iron has been freed from oil or grease, and then applying to the surface of the metal plate a coating of rubber and sulphide of antimony—say, in the proportion of one pound of rubber to about two or three pounds of sulphide, and naphtha sufficient to reduce the mass to a semi-fluid condition. After this solution has dried on the metal surface, then the body of the rubber, of substantially the same composition, is united thereto by vulcanization. I do not, however, confine myself to these especial ways of uniting the rubber to the metal, as other ways for obtaining such a union as shall accomplish the purposes of the invention may be used; nor do I claim the especial means above described for accomplishing this union.

Of course the entire under surface of the rubber, or only a section thereof, may be united to the metal plate, and I represent in Fig. 4 the front portion of the rubber as united to the step in this manner, that being the portion of the step which is subjected to the greatest wear, and which needs, therefore, to be most firmly secured in place; and I also show the mechanical method of uniting by means of rivets of rubber, which extend through holes in the step-plate, as above explained. In Fig. 5, I represent the entire under surface of the rubber as thus secured to the metal plate.

C represents in the above figures the interposed film, which constitutes the uniting medium. In addition to this feature I have provided the step-plate with the projecting portion D upon its under surface, which is adapted to fit into the recess e in the upper surface of the shank E, and I also provide the step-plate with the screw-stud b, which extends through the hole e' in the shank and receives the nut e², by which the step is firmly locked to the shank.

Instead of having the molded surface of the rubber extend over the wall b' of the metal plate, as represented in my Patent No. 220,667, sufficiently to be removed in the act of trimming off the fin a of rubber which is formed by the overflow in vulcanization under pressure, I bring it within the edge sufficiently to enable the edge to be used as a guide for cutting or trimming off the fin, so that the edge of the molded pad is not disfigured or injured on account of any irregularity of the edge of the step, which would be the case if the pattern itself were trimmed, using the edge as a guide, the edge of the metal plate often being quite irregular.

Of course I do not confine the invention to steps having a metal protecting wall, as represented in Figs. 4 and 5, but may use the invention in connection with flat-surfaced metal plates, as shown in Fig. 7, and for carriage or car or door steps.

In lieu of forming the plate with the projecting portion D to fit the depression in shank, there may be used studs, as represented in Fig. 6, by which the shank is centered and held.

In practicing the invention, I may use as a substitute for the rubber tread any material which can be united to the metal step-plate in the act of molding it thereon by heat or pressure or either.

In my Letters Patent No. 220,667, dated October 14, 1879, I describe an improvement in carriage-steps, one of the features of which is the uniting of the rubber or elastic tread to a metal supporting-plate by cement. This method of fastening, however, cannot be practiced until the tread has been molded or formed, and it requires that a very uniform pressure be applied to the tread in order that it may be properly fastened to the plate; and when the surface of the tread is irregular or uneven, as is generally the case, it is impossible to get such uniform pressure except by considerable expense. In my Patent, No. 203,076, dated April 30, 1878, I describe a step in which the tread surface or pad is united to the metal supporting-plate in the act of molding its surface to the material; but in order to hold the material, step, or pad to the plate it is necessary that said plate be formed to receive it and hold it mechanically. As, however, in my present invention the tread is not separately formed and afterward cemented, and the plate need not be shaped to provide for a mechanical union, I consider these patents do not describe the essential features of the invention.

Having thus fully described my invention, I claim and desire to secure by Letters Patent of the United States—

1. A carriage, car, or door step having a metal supporting-plate and a rubber or other like tread united to the upper surface of the plate in whole or in part by an interposed layer or plating of metal of the character specified, which is caused to unite the tread to the plate in the act of vulcanizing the tread, substantially as shown and described.

2. The combination, in a carriage, car, or door step, of a metal supporting-plate, the tread of vulcanized material, and a fastening or uniting medium, of the character described, interposed between the tread and the supporting-plate and caused, by the act of vulcanizing the tread to unite it to the surface of the metal plate, all substantially and for the purposes described.

3. The carriage, car, or door step comprising a metal supporting-plate and an elastic tread, united to the step by heat and pressure or either, and having its molded edge within the line of the metal edge of the supporting-plate, and a trimming-edge outside said molded edge, all substantially as and for the purposes described.

4. The combination, in a carriage-step, of the metal plate B, having the projecting portion D, shaped as shown and specified, with the shank E, having the recess *e* in the upper surface thereof, and means for locking the step-plate to the shank, all substantially as and for the purposes described.

5. The combination of a tread or surfacing compound, a step-plate, and means, substantially as specified, for uniting the tread or compound to the surface of the plate while the tread or compound is being molded or shaped upon the plate by heat and pressure or either, substantially as described.

FRANCIS A. SAWYER.

Witnesses:
F. F. RAYMOND, 2d,
WILLARD C. FOGG.